(12) United States Patent
Miller, II

(10) Patent No.: US 8,736,678 B2
(45) Date of Patent: May 27, 2014

(54) METHOD AND APPARATUS FOR VEHICLE SURVEILLANCE SERVICE IN MUNICIPAL ENVIRONMENTS

(75) Inventor: Robert R Miller, II, Convent Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 892 days.

(21) Appl. No.: 12/332,621

(22) Filed: Dec. 11, 2008

(65) Prior Publication Data

US 2010/0149335 A1 Jun. 17, 2010

(51) Int. Cl.
*H04N 7/00* (2011.01)
*H04N 7/18* (2006.01)

(52) U.S. Cl.
USPC .......................................... 348/148; 348/159

(58) Field of Classification Search
USPC .......................................................... 348/148
See application file for complete search history.

(56) References Cited

U.S. PATENT DOCUMENTS

| | | | |
|---|---|---|---|
| 5,926,103 A * | 7/1999 | Petite ............................ | 340/8.1 |
| 6,112,075 A | 8/2000 | Weiser | |
| 6,377,296 B1 * | 4/2002 | Zlatsin et al. ................. | 348/143 |
| 6,583,813 B1 * | 6/2003 | Enright et al. ................ | 348/150 |
| 6,636,256 B1 * | 10/2003 | Passman et al. .............. | 348/143 |
| 6,650,360 B1 * | 11/2003 | Osen ............................. | 348/157 |
| 6,657,584 B2 * | 12/2003 | Cavallaro et al. ......... | 342/357.61 |
| 6,697,103 B1 * | 2/2004 | Fernandez et al. ............ | 348/143 |
| 6,987,451 B2 * | 1/2006 | McKeown et al. ............ | 340/541 |
| 7,131,136 B2 * | 10/2006 | Monroe ......................... | 725/105 |
| 7,149,325 B2 * | 12/2006 | Pavlidis et al. ............... | 382/103 |
| 8,125,529 B2 * | 2/2012 | Skoskiewicz et al. ..... | 348/211.2 |
| 2001/0022615 A1 * | 9/2001 | Fernandez et al. ........... | 348/143 |
| 2003/0043279 A1 * | 3/2003 | Alardin ....................... | 348/211.3 |
| 2003/0210329 A1 * | 11/2003 | Aagaard et al. ............... | 348/159 |
| 2004/0105005 A1 * | 6/2004 | Yamamoto et al. ........... | 348/159 |
| 2005/0134685 A1 * | 6/2005 | Egnal et al. ................... | 348/157 |
| 2006/0040639 A1 | 2/2006 | Karl et al. | |
| 2006/0132605 A1 * | 6/2006 | Watanabe et al. ............. | 348/159 |
| 2006/0158349 A1 * | 7/2006 | Oesterling et al. ....... | 340/870.07 |
| 2007/0035627 A1 * | 2/2007 | Cleary et al. ................. | 348/159 |
| 2007/0039030 A1 * | 2/2007 | Romanowich et al. ....... | 725/105 |
| 2007/0182818 A1 * | 8/2007 | Buehler ........................ | 348/143 |
| 2008/0278582 A1 * | 11/2008 | Chung et al. ................. | 348/159 |
| 2009/0073265 A1 * | 3/2009 | Greenhill et al. ............ | 348/148 |
| 2009/0231433 A1 * | 9/2009 | Grigsby et al. ............... | 348/149 |

* cited by examiner

*Primary Examiner* — Moustafa M Meky
*Assistant Examiner* — Blake Rubin
(74) *Attorney, Agent, or Firm* — Baker & Hostetler LLP

(57) ABSTRACT

A set of cameras can operate in coordination for surveillance purposes to provide situation awareness at a system level. Any infrastructure of cameras, public or private, can incidentally view and record an individual's mobile property when in view of any of these cameras. A locating unit can determine the approximate location of a mobile property. A monitoring device that correlates to the mobile property's location can be selected. The transmission of surveillance information from the selected monitoring device can be provided to a user, such as via a transmission to the user's mobile device. Thus, the individual can have access to the monitoring device's viewing or recorded data to increase surveillance of mobile property.

23 Claims, 7 Drawing Sheets

METHOD AND APPARATUS FOR VEHICLE SURVEILLANCE SERVICE IN MUNICIPAL ENVIRONMENTS

BACKGROUND

Conventional surveillance cameras are typically fixed in a location of interest for monitoring that location or for recording audio and video files related to that location. For example, individuals may set up personal security systems with surveillance cameras in or around the individual's home to monitor personal property, such as a home or vehicle. Companies may also provide security services that monitor activity in or near the individual's home. For example, a security company may manage a monitoring system for a residential property that includes cameras, temperature sensors, sensors to detect break-ins, etc. The company may notify appropriate personnel (e.g., police or fire company) upon the detection of a triggering event (e.g., observing suspicious activity, detection of excessive temperatures, etc).

Although services exist to visually monitor activity in or around a home, the services are not effective for mobile property. In particular, a fixed location camera on an individual's residence or land is not capable of monitoring mobile property that moves out of the camera's viewing area or listening radius. For example, consider a vehicle that is driven off of the individual's land and out of view of any of the fixed position cameras. The fixed location cameras are no longer effective when the vehicle moves out of range of any of the cameras. Alternate methods of monitoring such mobile property have also not been very effective. For example, with respect to a vehicle, conventional car alarms are typically ineffective, serving to better function as a neighborhood irritation than a deterrent. Companies exist for detection of theft after property is stolen, but these require a special unit, such as a unit in an automobile, and the unit is for recovery, not prevention.

SUMMARY

Monitoring devices that are installed in various locations often incidentally have a view of and may record data related to an individual's mobile property. For example, when a vehicle is located in a camera's operating region, the camera may record video and audio files related to the vehicle. If an individual can have access to surveillance data from monitoring devices located in various locations, the individual can increase the surveillance of a mobile property.

In an example embodiment, a location of interest can be the location of a mobile property. A monitoring device having the best view of the mobile property can be selected, such as a camera with a view that includes or is proximate to the location of the mobile property. The feed from the camera can be transmitted to a device associated with a user or to a central server that can process the surveillance data and transmit the data to a user's device. Thus, the individual can have direct or indirect access to the feed from the camera, such as an audio or video feed, that is associated with that location of interest. The feed can be of a select camera's view, and that view can include an image of the mobile property or an area proximate to the mobile property. In this manner, an individual can have the ability to monitor the individual's mobile property while they are away from the mobile property by viewing the surveillance data from an available monitoring device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Figure 1:
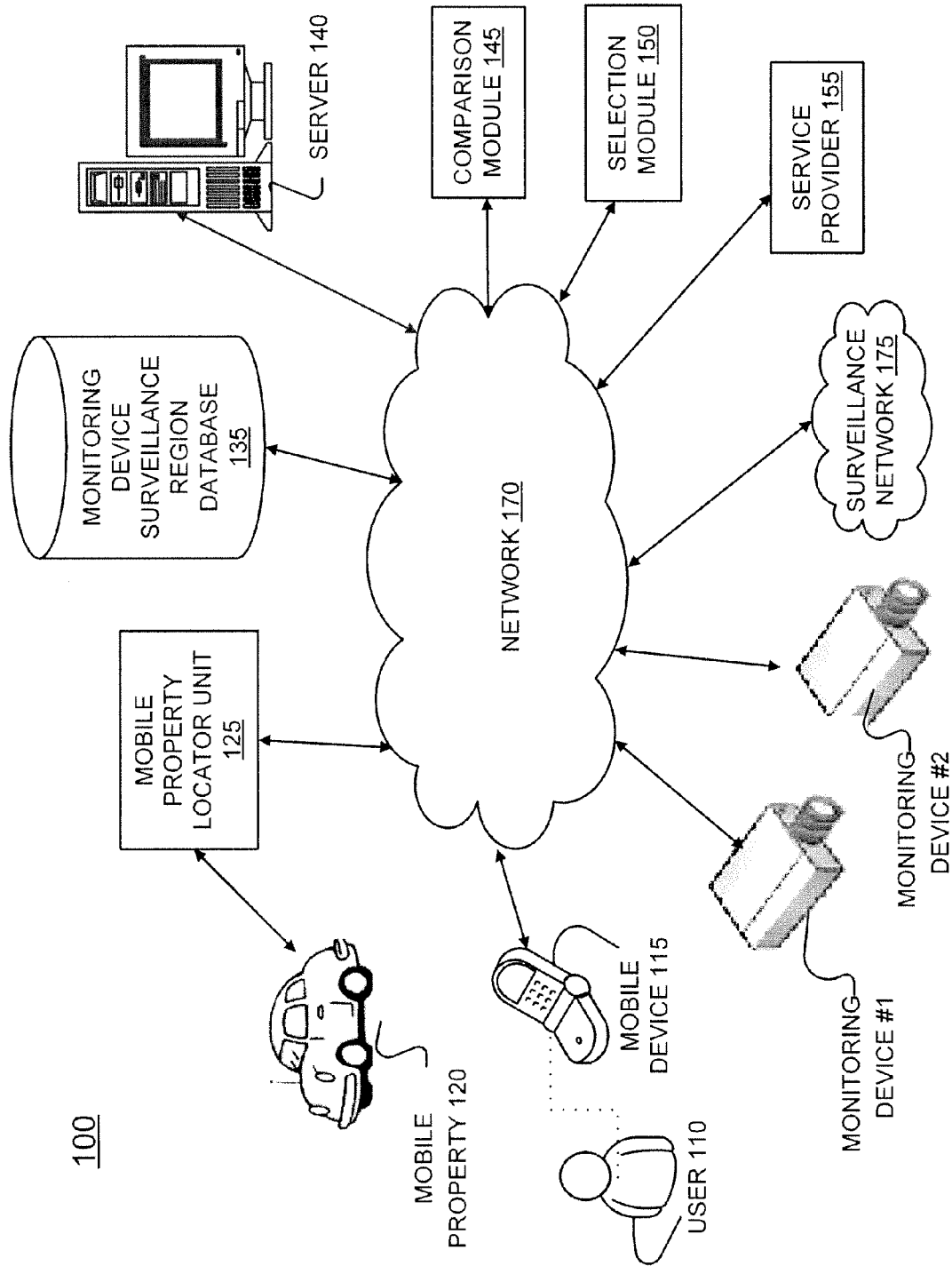
FIG. 1 depicts an example configuration of a system that uses a network to select and transmit information from a selected monitoring device for surveillance of a mobile property.

It would be desirable to have a surveillance system for certain types of mobile property. For example, an automobile is an important investment for many individuals, second only to maybe the individual's home. While home surveillance systems can be installed in and around the home, it would be desirable to monitor mobile property when the mobile property is outside the monitoring capabilities of a fixed-location home security system. For example, an individual can drive downtown and leave his or her vehicle in a parking garage for several hours. When the mobile property moves outside the boundaries of the home security system's capabilities, the individual loses the ability to monitor the vehicle. It would be desirable to have a method of monitoring a mobile property, such as a vehicle, throughout its movement and, for example, when in a location that is remote to the individual's home security system.

A surveillance region of a monitoring device, that includes or is proximate to the location of the mobile property, can provide situational awareness and monitoring capabilities for the area in and around the mobile property. Disclosed herein are location-relevant techniques that use the location of a mobile property to identify at least one available monitoring device that correlates to the location of the mobile property. The monitoring device can record or otherwise capture information associated with the surveillance region of the monitoring device. The information can be used to monitor the mobile property.

The aspects summarized above can be embodied in various forms. Embodiments are related to determining a location of a mobile property, such as via location-based technology. The location can be compared to the surveillance region of a plurality of monitoring devices. As the mobile property enters into the surveillance region of a monitoring device, that monitoring device can provide information about the surveilled region. For example, the monitoring device can be a camera. When the mobile property is within a viewing region of the camera, the camera can transmit a live video feed to a server which in turn can transmit the feed to a user's mobile device. Thus, while the owner of a vehicle is away from the mobile property, such as when a vehicle is left in a parking garage, for example, a user can monitor a live video feed of the vehicle that is captured by a suitable monitoring device. The user, that has access to the information from the monitoring device, can be the vehicle owner, a security service, a wireless communications provider, etc. In an example embodiment, the user can be the vehicle owner and can receive the information on a personal mobile device 115, such as a PDA, while the owner is away from the vehicle. In another example embodiment, the user can be a security service that provides a network to the monitoring devices, collecting the information at a central server.

The following description shows, by way of illustration, combinations and configurations in which the aspects can be practiced. It is understood that the described aspects and/or embodiments are merely examples. It is also understood that other aspects and/or embodiments can be utilized, and structural and functional modifications can be made, without departing from the scope of the present disclosure. For example, although some aspects herein relate methods of monitoring a vehicle via a camera and transmitting a live feed from the camera to a mobile device, it should be noted that any mobile property can be monitored by any suitable monitoring device, and an output of the monitoring device can be transmitted to a multitude of devices.

Many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but can comprise disparate instructions stored in different locations which, when joined logically together, comprise the module and achieve the stated purpose for the module. Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network.

Reference throughout this specification to "one embodiment," "an embodiment," "an example embodiment," or similar language means that a particular feature, structure, or characteristic described in connection with the embodiment is included in at least one embodiment of the present techniques disclosed. Thus, appearances of the phrases "in one embodiment," "in an embodiment," "an example embodiment," and similar language throughout this specification may, but do not necessarily, all refer to the same embodiment.

FIG. 1 illustrates an example system 100 in which aspects of the techniques described herein can be employed. System 100 can include user 110, mobile device 115, mobile property 120, a mobile property locating unit 125, a monitoring device surveillance region database 135, a server 140, a comparison module 145, a selection module 150, a service provider 155, a surveillance network 175, and monitoring devices #1 and #2.

In an example configuration, mobile device 115, the mobile property locating unit 125, the monitoring device surveillance region database 135, the server 140, a comparison module 145, a selection module 150, and monitoring devices #1 and #2 communicate with one another by way of network 170, such as a communications network. For example, user 110 can communicate over the network 170 with the server 140 through mobile device 115.

The network 170 can be any suitable network that enables the elements shown to communicate. For example, the network 170 can include an intranet, the Internet, a local area network (LAN), a wide area network (WAN), a public switched telephone network (PSTN), a metropolitan area network, a cellular network, a voice over internet protocol (VoIP) network, or the like. Accordingly, embodiments can be applicable to any network type including, for example, TDMA, CDMA, WCDMA, GSM, WiFi, WiMAX, OFDM, UMTS, EV-DO, HSDPA/HSUPA and other standards now known or to be developed in the future. The network 170 can be any type of communication network such as the internet, a Local Area Network (LAN), a Wide Area Network (WAN), a cellular telephone network, or the like. For example, the network 170 can include the example networks described below in FIGS. 3-5 such as Global System for Mobile communication ("GSM"), General Packet Radio Service ("GPRS"), Universal Mobile Telephone System ("UMTS"), Frequency Division Duplexing ("FDD") and Time Division Duplexing ("TDD"), High Speed Packet Data Access ("HERMDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), WiFi, WiMAX, or the like.

The mobile device 115 can be representative of any appropriate type of mobile device 115, such as a cellular device that a user 110 typically carries on his or her person. The mobile device 115, as it is described herein, can include any mobile device 115 that has, for example, video playback capabilities or internet access. The mobile device 115 can operate in a cellular, SMR, PCS, cordless, unlicensed AWS, 700 MHz, or other spectrums. According to example embodiments, the mobile device 115 can be, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

In the discussion that follows, any further details relating to mobile devices and networks are assumed to be well known. Accordingly, such details can be omitted herein for the sake of clarity and explanation. In addition, any references herein to an example embodiment involving a cellular telephone is solely for purposes of explanation, and is not intended to limit the techniques disclosed to any such embodiment.

While the elements shown in FIG. 1 are shown as capable of communicating via the communications network 170, other methods of connecting the elements are contemplated. Thus, any combination of connections, e.g., wireless, networked, wired, or the like, are contemplated. In various embodiments, a direct connection can be made between of the elements shown in FIG. 1, such as a wired or interconnected connection. For example, the mobile property locating unit 125 can be coupled to or otherwise associated with the mobile property 120 and provide an approximate location of the mobile property 120 via a wired connection to another element in the system 100.

A mobile property 120 can include any property that moves or can be moved from a location. For example, mobile property 120 can be a vehicle, a boat, a trailer, a bag, a mobile device, a camera, etc. If the mobile property 120 has the ability to detect the approximate location of the vehicle, the disclosed techniques can be used for surveillance of that mobile property 120. For example, the approximate location of the mobile property 120 can be determined via location-based technology or otherwise provided by a mobile property locator unit 125 or a user 110.

Location information pertaining to the mobile property 120 can be received from a variety of types of position determining equipment having different underlying technologies, such as: GPS (Global Positioning System); angle of arrival (AOA); time difference of arrival (TDOA); Line of Sight (LOS); etc. The location-based technology can continuously determine the location of mobile property 120.

The monitoring device surveillance region database 135 can be any form of data storage, including a storage module, device, or memory, for example. The database 135 can be provided as a database management system, an object-oriented database management system, a relational database management system (e.g. DB2, Access, etc), a file system, or another conventional database package. Further, the database 135 can be accessed via a Structure Query Language (SQL), or other tools known to one of ordinary skill in the art. The monitoring device surveillance region database 135 can contain an inventory of data about each monitoring device, such as a structured storage of positional data relating to the surveillance region of each monitoring device.

The monitoring device surveillance region database 135, shown as a single database, represents any number of databases or data stores that include surveillance information that can be accessed to compare and select suitable monitoring devices for a particular surveillance request. The monitoring device surveillance region database 135 can be publicly accessible and searchable and can include information associated with monitoring devices that are both public and private. The information from the monitoring device surveillance region database 135 can be accessible in a variety of ways, such as via the internet. For example, the user 110 can access the monitoring device surveillance region database 135 from a web type of browser. A device, such as a server 140, can maintain and update the monitoring device Surveillance of a mobile property 120 can be accomplished by not only installing monitoring devices in various locations for that purpose but by leveraging off existing surveillance systems. For example, the use of cameras for surveillance continues to proliferate for a variety of applications, such as private security, homeland security, crime detection, traffic management, crowd control, border control, weather condition monitoring, and military applications, for example. Many municipalities are installing cameras in public areas, such as street lights and traffic signals, for video surveillance. Many private entities install cameras as well, often for security reasons, such as in an entity's parking garage, for example.

A monitoring device can be any suitable device that has a surveillance region and can provide information associated with that region. For example, a monitoring device can be a camera that can transmit a video feed of a particular location of interest. A monitoring device can be placed in a fixed geographic locations. The monitoring device can also be mobile, such as a camera in a vehicle or plane.

Multiple cameras can operate in coordination for surveillance purposes to provide situational awareness at a system level. The surveillance data from a surveillance camera or a set of surveillance cameras can be forwarded to a central server 140 or a mobile device 115 associated with a user 110. For example, a system can network to available cameras and have a central server 140 that receives surveillance data from the cameras on the network 170. The central server 140 can have forwarding or transmitting capabilities to further provide the surveillance information. The surveillance data can be made available via a web browser or the internet. For example, a plurality of monitoring devices can be coupled to an IP network router. The IP network router can be coupled to a central server 140 via a network link. The monitoring devices can transmit information to the central server 140. The monitoring device in the IP network can have a web server application embedded in them. Each web server has a unique URL (Uniform Resource Locator) which can allow a camera's live image stream to be viewed remotely through a web browser or other web-enabled application. The web browser can communicate directly with the camera's dedicated web server using a common web protocol such as HTTP (Hypertext Transfer Protocol) or RTP (Real Time Protocol). Various vendors make available software applications that allow a mobile communication device to remotely view a camera's live image stream through the embedded web browser on the mobile device 115.

The server 140 can couple the mobile property 120 location with the surveillance regions of available cameras in a municipal network, for example, and transmit the information to participating users. The monitoring devices can output a feed directly from the monitoring device to a mobile device 115 of a particular user 110, without going through the central server 140 node. The monitoring device's geospatial coordinates can be mapped to a Geographic Information System (GIS) or other viewing application for enhanced visualization by an organization before transmitting to a user's mobile device 115.

The surveillance region can be defined by positional data or coordinates. The positional data can define a region in which the monitoring device operates. For example, the region in which a camera operates can be defined by the camera's viewing area or listening radius. The viewing area can depend on the strength of the camera lens, the location and angle of the camera, any movement of the camera (e.g., rotation, affixed to a moving vehicle, etc), or the like. The surveillance region information can change dynamically, thus the database 135 can be constantly updated. For example, new monitoring devices can be installed or, in some examples, the monitoring device is rotating or is in transit.

The mobile property locating unit 125 can provide an approximate location of the mobile property 120. A comparison module 145 can compare information from the monitoring device surveillance region database 135 and the locating unit 125. For example, the comparison module 145 can compare the approximate location of the mobile property 120 to the positional data in the monitoring device surveillance region database 135. The comparison module 145 can provide its results to the selection module 150.

The selection module 150 can select a monitoring device based on the surveillance region that best correlates to the approximate location of the mobile property 120. The selection module 150 can select multiple monitoring devices having a surveillance region that correlates to the approximate location of the mobile property 120. Based on the determination by the selection module 150, the surveillance information from the selected monitoring device(s) can be provided to a mobile device 115. The mobile device 115 can be a device associated with a particular user 110 that owns the mobile property 120. The information can be transmitted as audio feed, a video feed, a broadcast, an email, an image, a picture, an SMS message, or the like. In an example embodiment, the selection module 150 indicates the correlating monitoring devices and the user 110 can select the information to view (e.g., by selecting information from a particular monitoring device) or the user 110 can cycle through the information provided from each correlating monitoring device. For example, the user 110 can view a live video feed from a camera that has a view of the user 110's mobile property 120. The user 110 can view a single feed if only one monitoring device has a view or is proximate to the mobile property 120. However, multiple monitoring devices can be available and the user 110 can select to view a split screen of video feeds or cycle between the various views.

The selection module 150 can compare the surveillance region to the approximate location of the mobile property 120 to determine if the surveillance region correlates to the mobile property 120's location. A surveillance region can correlate to a mobile property 120's location in a number of ways. For example, a surveillance region can correlate to a mobile property 120's location if the surveillance region includes or is proximate to the approximate location of the mobile property 120. In another example, the comparison module 145 can define triggering location regions that can be created based on the positional data of various surveillance regions. The triggering location region can be defined as a range from a mobile property 120's approximate location. For example, the triggering location region could be a region comprising a variable range from the approximate location of the mobile property 120. If the mobile property 120's approximate location is within a particular triggering location region, the comparison module 145 can identify the monitoring device(s) that define(s) the triggering location region and provide these results to the selection module 150. Thus, the comparison module 145 can provide suitable monitoring devices, based on the approximate location of the mobile property 120, to the selection module 150.

The location-based technology can continuously determine the location of mobile property 120. The comparison module 145 can receive the updated location of the mobile property 120 and execute the comparison between the mobile property 120's updated location and the surveillance regions of the available monitoring devices. If the position has changed or a different, but suitable, monitoring device is detected, the comparison module 145 can provide updated results to the selection module 150. The selection module 150 can determine the best monitoring device or devices that are suited for surveillance of the mobile property 120.

The comparison module 145 and selection module 150 are shown in FIG. 1 as networked and thus able to communicate with the server 140 via the communications network 170. However, either or both of these modules can be incorporated into or directly connected to a server 140, such as running on a processor within the server 140 or connected via a wired connection.

The server 140 can be a stand-alone device that can receive a mobile property 120's location, execute the comparisons and selections, and output a selected monitoring device(s). The server 140 can comprise a networking component that allows the various components of system 100 to communicate to each other. For example, the monitoring devices #1 and #2 and the surveillance network 175 can be networked to the server 140. The server 140 can be connected, via the network 170 or a direct connection for example, to the monitoring device surveillance region database 135. The server 140 can maintain and update the database 135 based on information received from the monitoring devices and the surveillance network 175 (i.e., the surveillance regions of the various monitoring devices in the network 170). The server 140 can receive transmissions from the networked monitoring devices, such as live video or audio feeds. The server 140 can communicate, via the network 170, to a user 110's mobile device 115 and provide, for example, a live video feed from a monitoring device.

Thus, the server 140 can be networked to a surveillance network 175 and store data associated with the monitoring devices in the network 170. For example, the server 140 can store positional data that defines the surveillance region of each monitoring device in the network 170. The server 140 can receive an approximate location of a mobile property 120 for a determination of whether any monitoring devices are available that correlate to the mobile property 120's location. The server 140 can compare the mobile property 120 location to the positional data of the monitoring devices. The server 140 can select the monitoring device that best correlates to the mobile property 120's location and transmit a feed from the monitoring device to a mobile device 115 associated with the user 110. Alternately, the server 140 can transmit multiple feeds from multiple monitoring devices that provide different or overlapping views of a particular location of interest.

In an example configuration, a plurality of monitoring devices, such as monitoring devices #1 and #2, can communicate via a separate, surveillance network 175, such as surveillance network 175. In another example configuration, a plurality of monitoring devices, such as monitoring devices #1 and #2, can be maintained separate from such a surveillance network 175 and communicate over the communications network 170 as shown.

Any number of monitoring devices can be available to capture and provide information related to a surveillance region. Surveillance equipment can be installed specifically to perform the disclosed techniques related to monitoring mobile property 120. For example, an organization can put up surveillance network using cameras that transmit over a wireless network. Alternately, the disclosed techniques can function with existing surveillance infrastructures, such as privately or publicly managed surveillance networks. The system can utilize a Wi-Fi wireless local area network, for example, or in some cases use an available commercial cellular network or a satellite connection. For example, many U.S. cities are adding cameras for surveillance to existing municipal Wi-Fi networks. Some municipalities or cities are installing cameras in public areas, such as street lights and traffic signals, for video surveillance. Many private entities install cameras as well, often for security reasons, such as in the entities' parking garages, for example.

The communications network 170 can be operated by a service provider 155 such as an internet service provider, a cellular telephone provider, or the like. According to an example embodiment, the network provider can offer bandwidth and/or network access to subscribers thereof to enable communication between the subscribers and other devices such as monitoring devices #1 and #2, the server 140, the mobile property locating unit 125, or the like. In one embodiment, the bandwidth and/or network access provided by the network provider can be limited to a particular surveillance network 175 in a particular location such as, for example, a country, a state, a city, a town, a county, or any other region defined by the network 170 provider in which the surveillance system can operate. A wireless network can comprise a plurality of wireless networks, such as interconnected wireless networks of various wireless service provides (e.g., Verizon Wireless, Sprint, Cingular, T-Mobile, etc.)

A service provider 155 can maintain both the communications network 170 and the surveillance system. For example, a wireless communications provider can provide a network to a surveillance system and manage the transmissions to/from the mobile property 120, the mobile device 115, the monitoring devices #1 and #2, etc. Alternately, a communications network and a service provider 155 can collaborate to provide services that incorporate the disclosed techniques. For example, network 170 could be managed by a service provider 155, and the service provider 155 could communicate with a user 110's mobile device 115 via a wireless communications network that is managed by a wireless communications provider.

A service provider 155 such as a security service, a surveillance system administrator, or a wireless communications provider can maintain and update the monitoring device surveillance region database 135. For example, the information in the monitoring device surveillance region database 135 can be structured to enable a person or program to extract desired information so that the service can determine what monitoring device can surveil the mobile property 120 and/or manage the transmissions to and from the monitoring devices in a particular surveillance network.

The service provider 155, using the disclosed techniques, can therefore offer a service that receives a location of a mobile property 120, compares it against the positional data of the monitoring devices and/or selects the monitoring device most suitable for providing information about that region. The service provider 155 can utilize a central server, such as server 140, to perform the disclosed techniques. The service provider 155 can update and maintain the server 140. Transmissions from the monitoring devices, such as camera feeds, can be received by a server 140 maintained by such a service provider 155, and the transmissions can be formatted and further transmitted to a user 110's mobile device 115. Uploading or streaming image and video files directly to a central server 140 allows for simultaneous viewing by an number of associated users. Individuals can have to establish independent connections (e.g., via a subscription) to that server or network to view the life feed (or archived feed) related to the subscription.

Thus, a collaboration of the components in system 100 could result in the aggregation of information about monitoring devices, such as positional data that represents their surveillance regions. An entity, such as a service provider or a server, can select the most suitable monitoring device (or plurality of devices) and transmit a representation of the information gathered by the monitoring device to a user 110 in some manner. In this manner, a user 110 can leave or otherwise move his or her mobile property 120 and receive status updates or a live video feed that allows the user 110 to monitor the mobile property 120. A video, for example, allows detection of break-in, vandalism, or cargo theft before the incident actually happens. It is far more likely that the owner of the vehicle or a protection company could take notification or other action in such a situation compared to the police.

Figure 2:
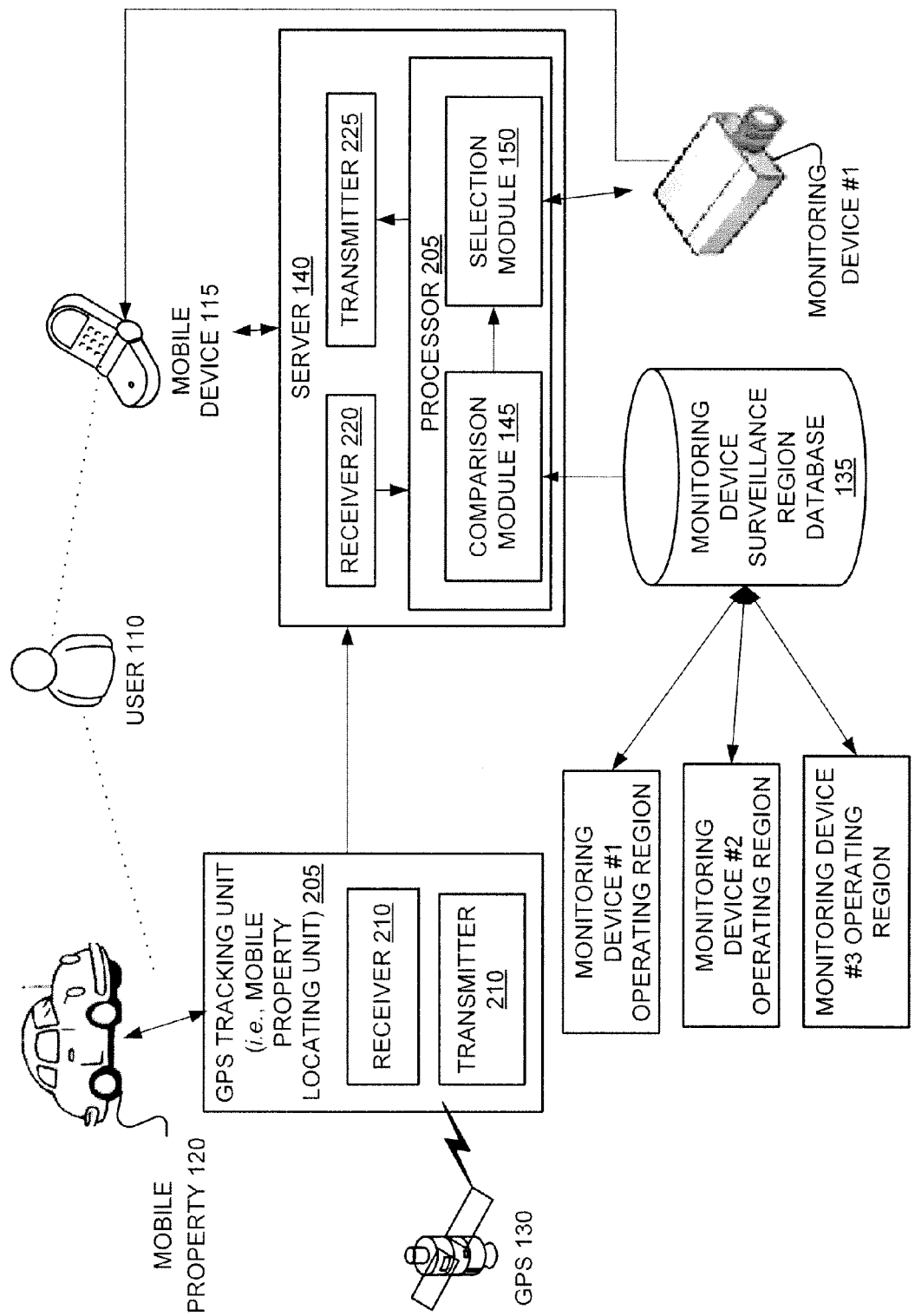
FIG. 2 depicts an example configuration of a surveillance system having a device for transmitting surveillance data related to a mobile property.

FIG. 2 depicts an example configuration of a system that can perform the disclosed techniques. Shown in FIG. 2 is a surveillance system that transmits an approximate location of a mobile property and receives surveillance information associated to mobile property 120. The example surveillance system comprises a mobile property locating unit 125, a server 140, a monitoring device surveillance region database 135, at least one monitoring device #1, and a mobile device 115 associated with user 110.

A method of approximating the location of the mobile property 120 in this example configuration is via the use of a GPS tracking unit 205. GPS 130 can assist in the determination of the location of mobile property 120. For example, a GPS tracking unit 205 can be affixed or otherwise incorporated into the mobile property 120. GPS 130 can include multiple satellites that orbit above the Earth. The GPS satellites can each contain a computer, an atomic clock, and a radio, operating to continuously broadcast its changing position and time.

The GPS tracking unit 205 can include a receiver 210, such as, for example, a GPS receiver 210 for receiving GPS information related to the mobile property 120. The GPS receiver 210 on the GPS tracking unit 205 can contain a computer or processing unit operating to calculate the position of the GPS receiver 210 through receipt of time signals. The position can be calculated from three satellites through a process called trilateration or through a process called triangulation, for example. The position can be provided in the form of a longitude and latitude. The GPS receiver 210 can further calculate altitude, speed of travel, and direction of travel. GPS information can include a timestamp with the longitude and latitude coordinates of mobile property 120. Alternately, the location can be in the form of an address, with a street number, city, and state, for example.

The GPS tracking unit 205 can provide an approximate location of the mobile property 120 to a server 140. The server 140 can communicate with the GPS tracking unit 205, at least one monitoring device, shown as monitoring device #1, a monitoring device surveillance region database 135, and a mobile device 115. As described with respect to FIG. 1, the server maybe communicate to the elements shown via a network, a direct connection, or the like. The server can maintain or manage the information related to each of the elements. The server can itself be managed by a service provider 155.

The server 140 can include a receiver 220 that receives the approximate location of the mobile property 120 from the GPS tracking unit 205. A processor 230 can execute a comparison module 145 and a selection module 150 using the approximate location of the mobile property 120 and the information available from the monitoring device surveillance region database 135. The comparison module 145 can compare information from the monitoring device surveillance region database 135 and the GPS tracking unit 205. The example monitoring device surveillance region database 135 has stored therein information about surveillance regions of monitoring devices #1, #2, and #3. The information about the surveillance regions can be, for example, positional data that represents the view of the monitoring device. The comparison module 145 can compare the approximate location of the mobile property 120 to the positional data in the monitoring device surveillance region database 135. The comparison module 145 can provide its results to the selection module 150.

The comparison module 145 can correlate a particular surveillance region to a location of interest to provide suitable monitoring devices, based on the approximate location of the mobile property 120, to the selection module 150. The comparison module 145 can define triggering location regions that can be created based on surveillance regions of various monitoring device. If the mobile property 120's approximate location is within a particular triggering location region, the comparison module 145 can identify the monitoring devices that define the triggering location region and provide these results to the selection module 150.

The selection module 150 can select one or more of the monitoring devices having a surveillance region that correlates to the approximate location of the mobile property 120. The selection module 150 can transmit a representation of the information gathered by the monitoring device to a mobile device 115, associated with user 110. For example, the server can receive a live video feed from the monitoring device #1 and transmit the live video feed (e.g., a camera) to a user 110's mobile device 115 via a transmitter 225. In this manner, a user 110 can leave or otherwise move his or her mobile property 120 and receive status updates or a live video feed that allows the user 110 to monitor the mobile property 120. The user's device or the central server 140 can store the information for later access.

The comparison module 145 and selection module 150 can be part of a network and have the ability to communicate with the server via the network. However, either or both of these modules can be incorporated into or directly connected to a server, as shown in FIG. 2.

There are many examples of services that could be employ the disclosed techniques. For example, consider a service provider 155 that provides security to a shopping mall location. A series of monitoring devices could be installed through the location of interest. The monitoring devices could be audio or video recorders. A user 110 can drive his or her vehicle into the shopping mall location. The user 110 can register or activate, with the service provider 155, a request for surveillance for a period of time, such as the duration of time that they are away from the vehicle and in the shopping mall. The service provider 155 can utilize a location provided from the mobile device 115 to select a suitable monitoring device(s). The service provider 155 can transmit a live video feed from the monitoring device to a user 110's mobile device 115 that is registered or activated for the service. Thus, the user 110 can constantly monitor the vehicle while inside the shopping mall.

In another example, a service provider 155 is a security system that offers general surveillance to its customers. The service provider 155 can gain access to private or public surveillance systems that already exist in certain locations, for example. Thus, a service provider 155 can integrate a method of communicating to various surveillance networks throughout a location to gain wider coverage for a surveillance of mobile property 120 that is in a static position or is in transit. The service provider 155 can install additional cameras to cover areas that aren't covered or that are target areas for surveillance. The service provider 155 can manage a database 135 that stores information for the available monitoring devices and uses this information to select a monitoring device for surveillance of a mobile property 120. The service provider 155 can gather the surveillance information that correlates to the mobile property's location and provide that information to a user's mobile device 115. The information can be transmitted as at least one of an audio feed, a video feed, a broadcast, an email, an image, a picture, an SMS message, or the like.

Figure 3:
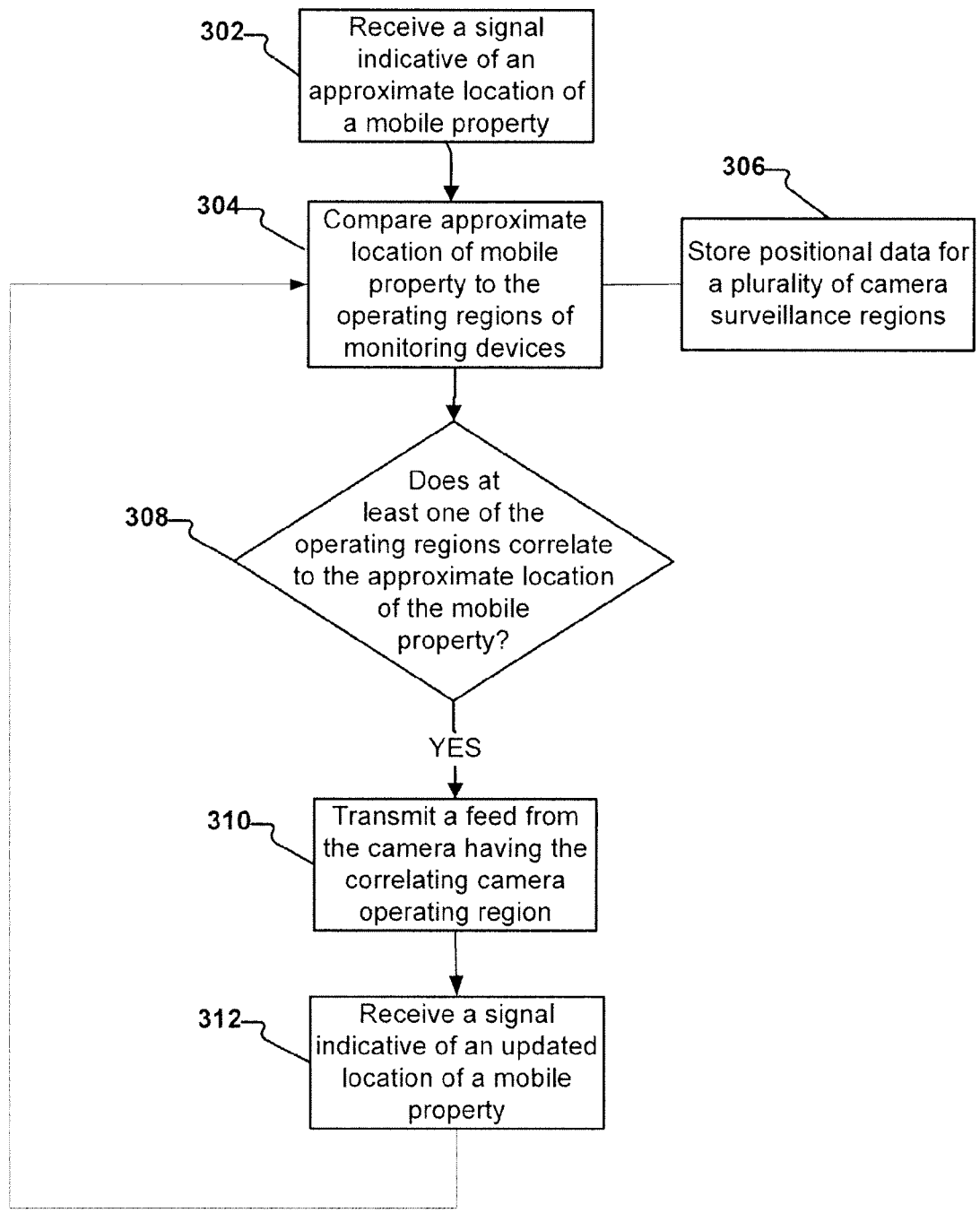
FIG. 3 depicts an example method of transmitting information from a monitoring device for surveillance of a mobile property.

FIG. 3 represents an example method of transmitting information from a monitoring device for surveillance of a mobile property 120. At 302, the method comprises receiving a signal indicative of an approximate location of a mobile property 120. As described above, several methods can be employed to determine the approximate location of a mobile property 120. For example, a GPS tracking unit 205 can be affixed or otherwise incorporated into the mobile property 120. The GPS tracking unit 205 can receive GPS information, such as coordinate and time information, related to the mobile property 120. The GPS tracking unit 205 can provide the signal indicative of an approximate location of the mobile property 120.

At 304, a module can compare the approximate location of the mobile property 120 to the surveillance regions of any number of monitoring devices. The monitoring devices can be located in various locations in a city, such as part of an existing surveillance network 175 set up by a municipality for crime prevention or traffic monitoring, for example. The monitoring devices can also be installed specifically for performing the disclosed techniques. The positional data for the surveillance regions of a plurality of monitoring devices can be stored at 306. Based on the comparison of the mobile property 120's location and the stored positional data, it is determined at 308 if at least one of the surveillance regions correlates to the approximate location of the mobile property 120. If it does, a feed from the monitoring device can be transmitted. For example, if the monitoring device is a camera, the feed can be a video feed. And a device associated with a user 110 with appropriate display capabilities can receive the transmitted video feed. For example, a user 110 can have a mobile device 115, such as a cell phone, that can receive the video feed and display it on a screen.

A mobile property 120, being as it is mobile, can move from location to location. At 312, the method comprises receiving a signal indicative of an updated location of the mobile property 120. If the location changes, the updated location can be compared, at 304, to the surveillance regions of the monitoring devices in the surveillance network. Thus, a different monitoring device can be selected for transmission if the approximate location of the mobile property 120 correlates to a surveillance region of the different monitoring device. Alternately, multiple monitoring devices can be selected for transmission, where each of the monitoring devices has a surveillance region that correlates to the mobile property 120's approximate location.

Figure 4:
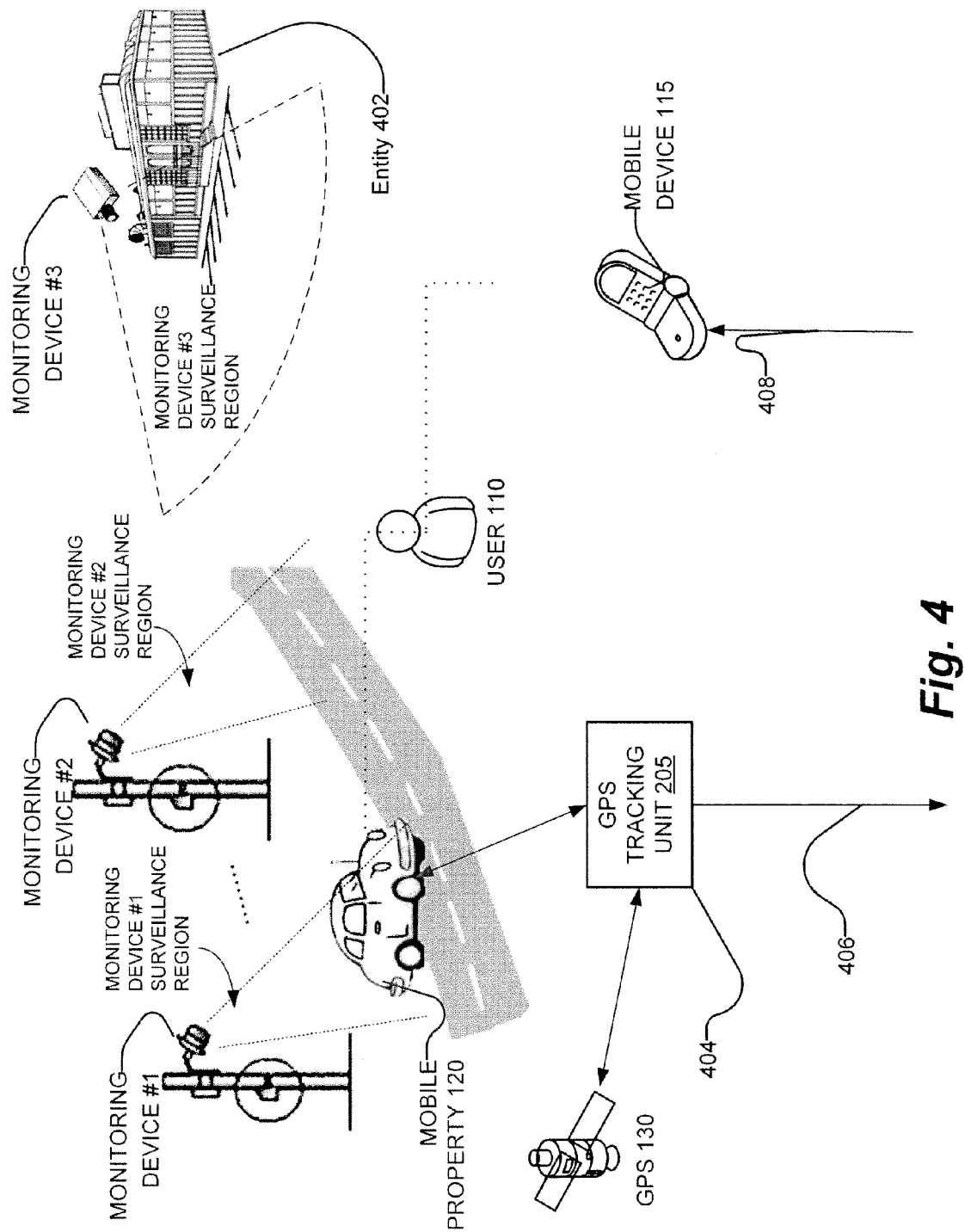
FIG. 4 depicts an example configuration and method of a surveillance system for receiving surveillance information related to a mobile property.

FIG. 4 depicts an example configuration and method of a surveillance system for receiving surveillance information about a mobile property 120. A user 110 can be associated with both a mobile property 120, shown as a vehicle, and a mobile device 115, shown as a cell phone. The user 110 can drive the vehicle from one location to the next, and then leave the vehicle, such as in a parking garage or lot, for example. The user 110 can wish to monitor his or her vehicle. Thus, the user 110 can employ a surveillance system that functions to receive a video feed associated with the location of the mobile property 120. In this example configuration, the surveillance system comprises a GPS tracking unit 205, a transmitter 215, a receiver 220, and a mobile device 115 having a display unit.

In this example, three monitoring devices are shown: monitoring devices #1, #2, and #3. Monitoring devices #1 and #2 represent cameras that are installed in traffic signals or street lights by a municipality. For example, the municipality can install cameras to detect and record criminal or suspicious activity or to capture images of traffic code violations, for example. Both monitoring devices #1 and #2 have a surveillance region, monitoring device #1 surveillance region and monitoring device #2 surveillance region, respectively. Monitoring device #3 represents a private security system installed by a private entity. For example, entity 402 can be a bank or a store. A service provider 155, such as a wireless communications provider, that manages a surveillance system can provide a network that all three monitoring devices can directly or indirectly connect so as to communicate with a central server.

A locating unit, shown as GPS tracking unit 205, can be affixed or otherwise associated with the mobile property 120. The GPS tracking unit 205 is a device that can use the Global Positioning System to determine the precise location of a vehicle, person or other asset to which it is attached and to record the position of the asset at regular intervals. If the mobile property 120 is a vehicle, for example, a vehicle tracking system can be installed in the vehicle to enable the owner or a third party to track the vehicle's location. Most modern vehicle tracking systems use Global Positioning System (GPS) modules for accurate location of the vehicle.

The GPS tracking unit 205 can be a device comprising a receiver 220, such as, for example, a GPS receiver 210 for receiving GPS information. The GPS information can be information such as coordinate and time information related to the mobile property 120. GPS 130 can include multiple satellites that orbit above the Earth. A GPS receiver 210 on the GPS tracking unit 205 can contain a computer or processing unit operating to calculate the position of the GPS receiver 210 through receipt of time signals. At 404, the GPS tracking unit 205 can determine the approximate location of the mobile property 120. For example, a position based on the GPS information can be calculated from three satellites through a process called trilateration or through a process called triangulation, for example. The position can be provided in the form of a longitude and latitude. The GPS receiver 210 can further calculate altitude, speed of travel, and direction of travel.

The GPS tracking unit 205 can provide the approximate location of the mobile property 120 at 406. As described with respect to FIGS. 1-3, a network, service provider 155, central server, or the like, can perform various techniques based on the received approximate location of the mobile property 120. In the example depicted in FIG. 4, the mobile property 120 could correlate to monitoring device #1 and monitoring device #2 as the surveillance region of monitoring device #1 includes the mobile property 120's location and the surveillance region of monitoring device #2 is in proximity to the mobile property 120. Depending on the capabilities of monitoring device #3 and the distance from the mobile property 120 that is being surveilled, monitoring device #3 can also correlate to the mobile property 120's location.

At 408, the mobile device 115 can receive a video feed from a monitoring device with a surveillance region that correlates to the mobile property 120's approximate location. The video feed can be received from the multiple monitoring devices that are selected for transmission, where each of the monitoring devices has a surveillance region that correlates to the mobile property 120's approximate location. As the mobile property 120 moves from location to location or is left in a particular location, the monitoring devices that correlate to the mobile property 120's location can change. If the location changes, the GPS tracking unit 205 can provide the updated location of the mobile property 120 and the mobile device 115 can receive a video feed from a different monitoring device. Thus, the user 110 is able to constantly monitor his or her mobile property 120 as long as a monitoring device is available that correlates to the mobile property 120's location.

The user 110's mobile device 115 can be part of a wireless communication network. The wireless communication network can provide the surveillance services described herein. In another example embodiment, a service provider 155, such as a security provider, can perform the monitoring/surveillance aspects of the disclosed techniques. The service provider 155 can collaborate with the wireless communications provider to transmit images, video, or other monitoring device feeds to a user 110's mobile device 115.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of channel assignment can be applied independently of the method for data transport, and do not depend on any particular network architecture, or underlying protocols.

Figure 5:
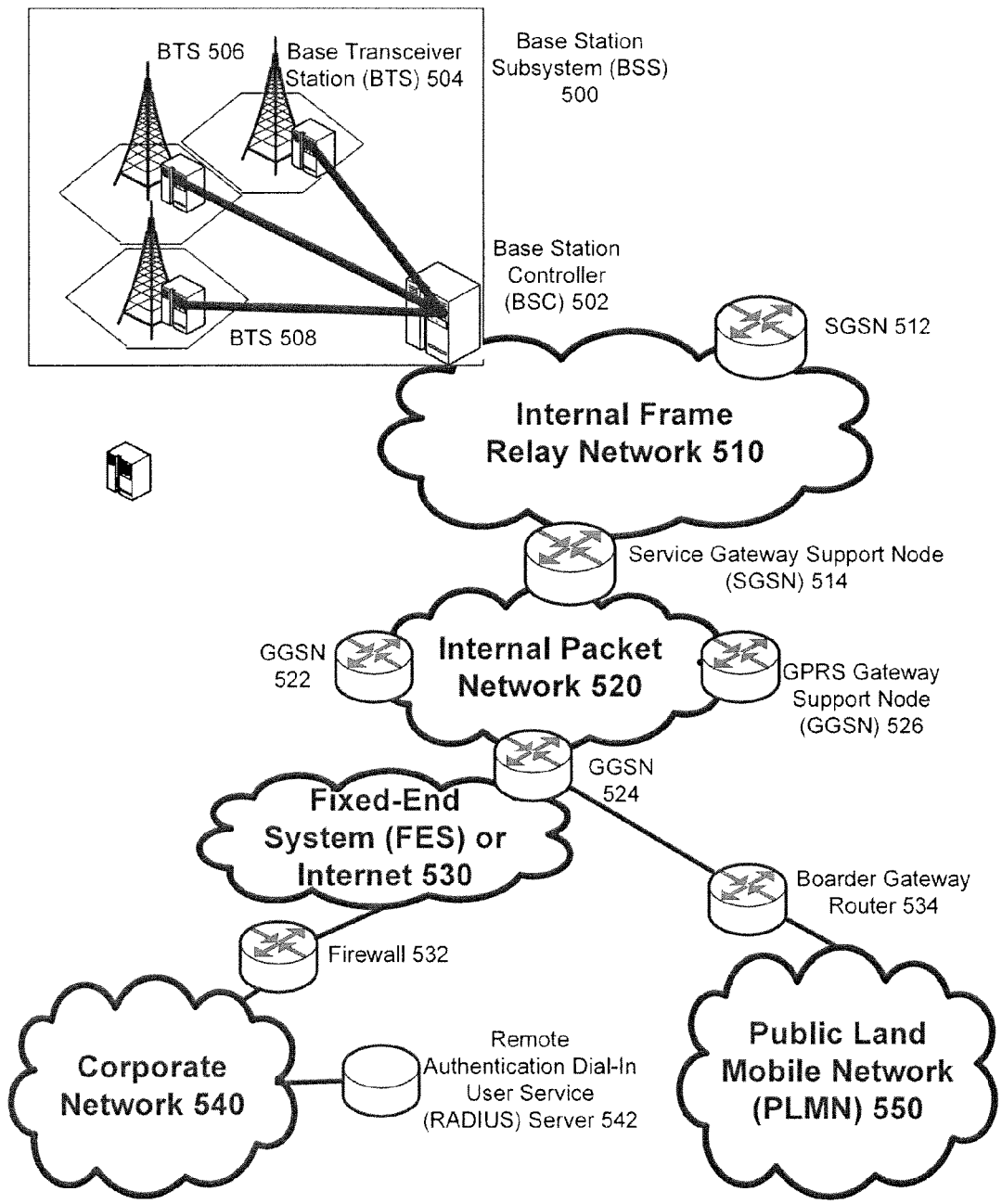
FIG. 5 is an overall block diagram of an exemplary packet-based mobile cellular network environment, such as a GPRS network, in which providing information pertaining to a motor vehicle can be implemented.

FIG. 5 depicts an overall block diagram of an exemplary packet-based mobile cellular network environment, such as a GPRS network, in which the system of the present subject matter can be practiced. In an example configuration, wireless provider network comprises a cellular radio network and towers which are encompassed by the network environment depicted in FIG. 5. In such an environment, there are a plurality of Base Station Subsystems ("BSS") 500 (only one is shown), each of which comprises a Base Station Controller ("BSC") 502 serving a plurality of Base Transceiver Stations ("BTS") such as BTSs 504, 506, and 508. BTSs 504, 506, 508, etc. are the access points where users of packet-based mobile devices (e.g., mobile device 115) become connected to the wireless network. In exemplary fashion, the packet traffic originating from user 110 devices (e.g., user device 115) is transported via an over-the-air interface to a BTS 508, and from the BTS 508 to the BSC 502. Base station subsystems, such as BSS 500, are a part of internal frame relay network 510 that can include Service GPRS Support Nodes ("SGSN") such as SGSN 512 and 514. Each SGSN is connected to an internal packet network 520 through which a SGSN 512, 514, etc. can route data packets to and from a plurality of gateway GPRS support nodes (GGSN) 522, 524, 526, etc. As illustrated, SGSN 514 and GGSNs 522, 524, and 526 are part of internal packet network 520. Gateway GPRS serving nodes 522, 524 and 526 mainly provide an interface to external Internet Protocol ("IP") networks such as Public Land Mobile Network ("PLMN") 550, corporate intranets 540, or Fixed-End System ("FES") or the public Internet 530. As illustrated, subscriber corporate network 540 can be connected to GGSN 524 via firewall 532; and PLMN 550 is connected to GGSN 524 via border gateway router 534. The Remote Authentication Dial-In user 110 Service ("RADIUS") server 542 can be used for caller authentication when a user 110 of a mobile cellular device calls corporate network 540.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 6:
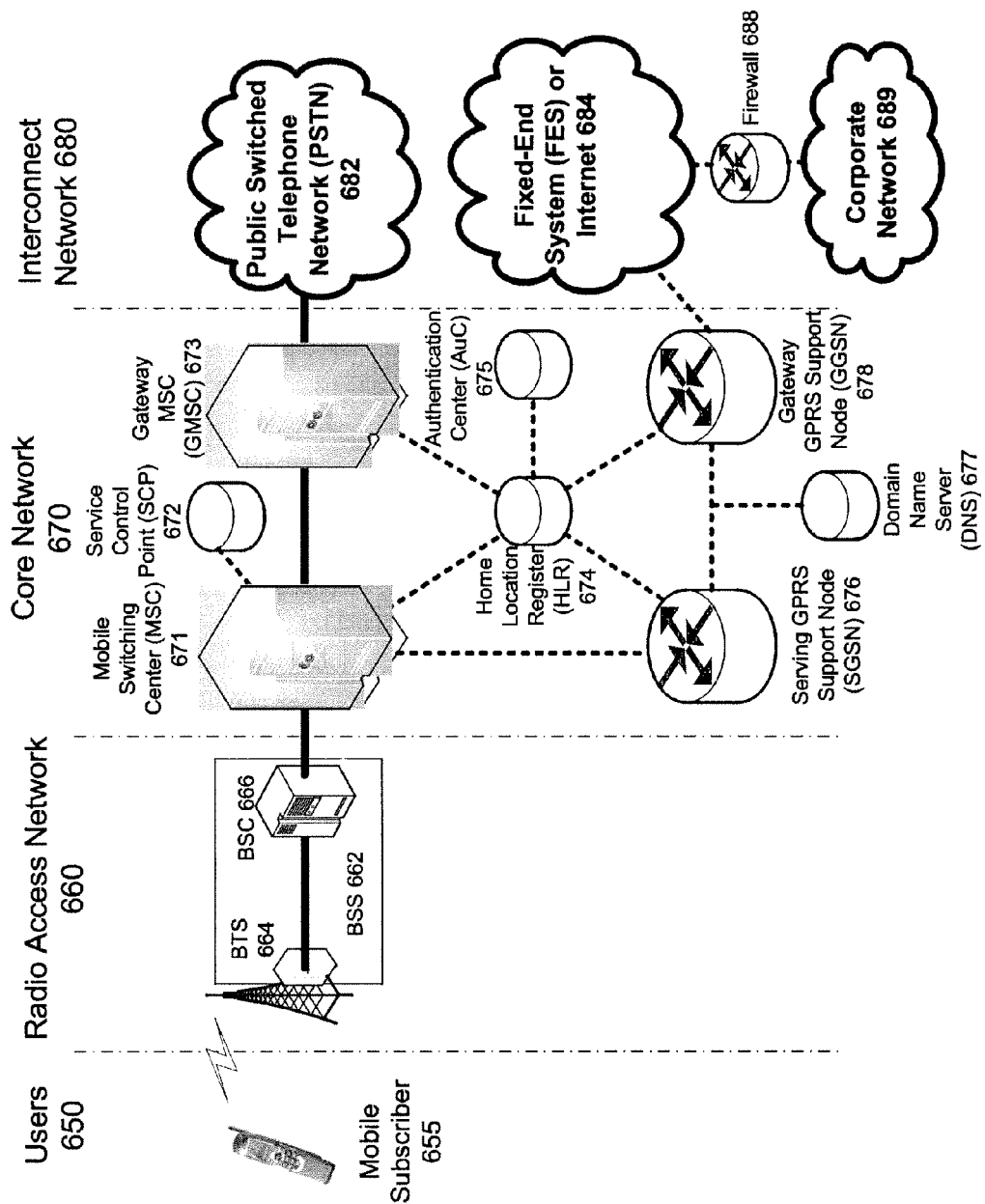
FIG. 6 illustrates an architecture of a typical GPRS network as segmented into four groups.

FIG. 6 illustrates an architecture of a typical GPRS network as segmented into four groups: users 650, radio access network 660, core network 670, and interconnect network 680. In one example configuration, wireless provider network is encompassed by the radio access network 660, core network 670, and interconnect network 680. Users 650 comprise a plurality of end users (though only mobile subscriber 655 is shown in FIG. 6). In an example embodiment, the device depicted as mobile subscriber 655 comprises a mobile device 115. In an alternate embodiment, the device depicted as mobile subscriber 655 comprises a navigation system. Radio access network 660 comprises a plurality of base station subsystems such as BSSs 662, which include BTSs 664 and BSCs 666. Core network 670 comprises a host of various network elements. As illustrated here, core network 670 can comprise Mobile Switching Center ("MSC") 671, Service Control Point ("SCP") 672, gateway MSC 673, SGSN 676, Home Location Register ("HLR") 674, Authentication Center ("AuC") 675, Domain Name Server ("DNS") 677, and GGSN 678. Interconnect network 680 also comprises a host of various networks and other network elements. As illustrated in FIG. 6, interconnect network 680 comprises Public Switched Telephone Network ("PSTN") 682, Fixed-End System ("FES") or Internet 684, firewall 688, and Corporate Network 689.

A mobile switching center can be connected to a large number of base station controllers. At MSC 671, for instance, depending on the type of traffic, the traffic can be separated in that voice can be sent to Public Switched Telephone Network ("PSTN") 682 through Gateway MSC ("GMSC") 673, and/or data can be sent to SGSN 676, which then sends the data traffic to GGSN 678 for further forwarding.

When MSC 671 receives call traffic, for example, from BSC 666, it sends a query to a database 135 hosted by SCP 672. The SCP 672 processes the request and issues a response to MSC 671 so that it can continue call processing as appropriate.

The HLR 674 is a centralized database 135 for users to register to the GPRS network. HLR 674 stores static information about the subscribers such as the International Mobile Subscriber Identity ("IMSI"), subscribed services, and a key for authenticating the subscriber. HLR 674 also stores dynamic subscriber information such as the current location of the mobile subscriber. Associated with HLR 674 is AuC 675. AuC 675 is a database 135 that contains the algorithms for authenticating subscribers and includes the associated keys for encryption to safeguard the user 110 input for authentication.

In the following, depending on context, the term "mobile subscriber" sometimes refers to the end user 110 and sometimes to the actual portable device, such as a mobile device 115 or a navigation system, used by an end user 110 of the mobile cellular service. When a mobile subscriber turns on his or her mobile device 115, the mobile device 115 goes through an attach process by which the mobile device 115 attaches to an SGSN of the GPRS network. In FIG. 6, when mobile subscriber 655 initiates the attach process by turning on the network capabilities of the mobile device 115, an attach request is sent by mobile subscriber 655 to SGSN 676. The SGSN 676 queries another SGSN, to which mobile subscriber 655 was attached before, for the identity of mobile subscriber 655. Upon receiving the identity of mobile subscriber 655 from the other SGSN, SGSN 676 requests more information from mobile subscriber 655. This information is used to authenticate mobile subscriber 655 to SGSN 676 by HLR 674. Once verified, SGSN 676 sends a location update to HLR 674 indicating the change of location to a new SGSN, in this case SGSN 676. HLR 674 notifies the old SGSN, to which mobile subscriber 655 was attached before, to cancel the location process for mobile subscriber 655. HLR 674 then notifies SGSN 676 that the location update has been performed. At this time, SGSN 676 sends an Attach Accept message to mobile subscriber 655, which in turn sends an Attach Complete message to SGSN 676.

After attaching itself with the network, mobile subscriber 655 then goes through the authentication process. In the authentication process, SGSN 676 sends the authentication information to HLR 674, which sends information back to SGSN 676 based on the user 110 profile that was part of the user 110's initial setup. The SGSN 676 then sends a request for authentication and ciphering to mobile subscriber 655. The mobile subscriber 655 uses an algorithm to send the user 110 identification and password to SGSN 676. The SGSN 676 uses the same algorithm and compares the result. If a match occurs, SGSN 676 authenticates mobile subscriber 655.

Next, the mobile subscriber 655 establishes a user 110 session with the destination network, corporate network 689, by going through a Packet Data Protocol ("PDP") activation process. Briefly, in the process, mobile subscriber 655 requests access to the Access Point Name ("APN"), for example, UPS.com (e.g., which can be corporate network 689 in FIG. 6) and SGSN 676 receives the activation request from mobile subscriber 655. SGSN 676 then initiates a Domain Name Service ("DNS") query to learn which GGSN node has access to the UPS.com APN. The DNS query is sent to the DNS server within the core network 670, such as DNS 677, which is provisioned to map to one or more GGSN nodes in the core network 670. Based on the APN, the mapped GGSN 678 can access the requested corporate network 689. The SGSN 676 then sends to GGSN 678 a Create Packet Data Protocol ("PDP") Context Request message that contains necessary information. The GGSN 678 sends a Create PDP Context Response message to SGSN 676, which then sends an Activate PDP Context Accept message to mobile subscriber 655.

Once activated, data packets of the call made by mobile subscriber 655 can then go through radio access network 660, core network 670, and interconnect network 680, in a particular fixed-end system or Internet 684 and firewall 688, to reach corporate network 689.

Thus, network elements that can invoke the functionality of the present subject matter can include but is not limited to Gateway GPRS Support Node tables, Fixed End System router tables, firewall systems, VPN tunnels, and any number of other network elements as required by the particular digital network.

Figure 7:
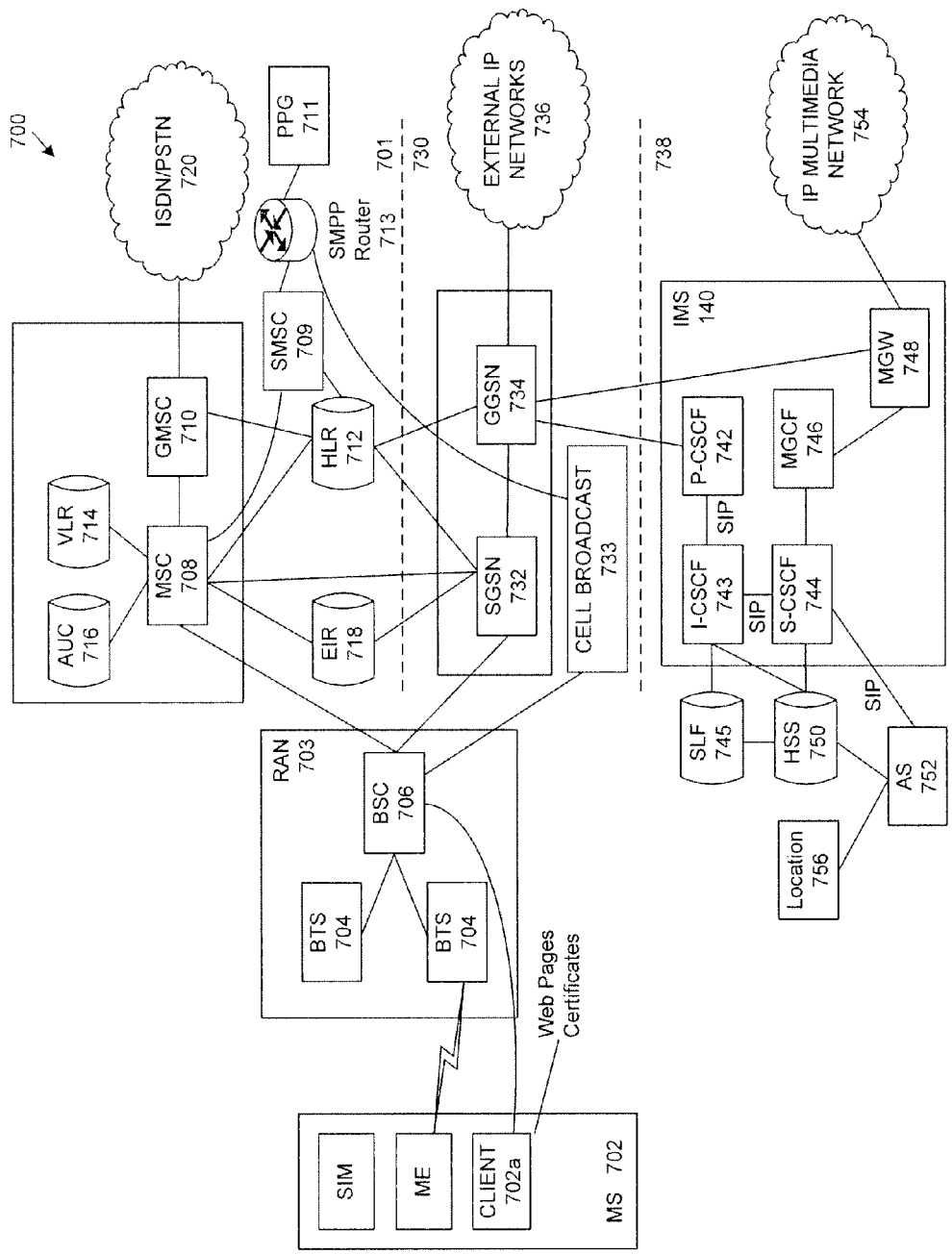
FIG. 7 illustrates an example alternate block diagram of an exemplary GSM/GPRS/IP multimedia network architecture in which providing information pertaining to a motor vehicle can be implemented.

FIG. 7 illustrates another exemplary block diagram view of a GSM/GPRS/IP multimedia network architecture 700 in which a system for providing information pertaining to a motor vehicle can be incorporated. As illustrated, architecture 700 of FIG. 7 includes a GSM core network 701, a GPRS network 730 and an IP multimedia network 738. The GSM core network 701 includes a Mobile Station (MS) 702, at least one Base Transceiver Station (BTS) 704 and a Base Station Controller (BSC) 706. The MS 702 is physical equipment or Mobile Equipment (ME), such as a mobile phone or a laptop computer (e.g., mobile device 115) that is used by mobile subscribers, with a Subscriber identity Module (SIM). The SIM includes an International Mobile Subscriber Identity (IMSI), which is a unique identifier of a subscriber. The BTS 704 is physical equipment, such as a radio tower, that enables a radio interface to communicate with the MS. Each BTS can serve more than one MS. The BSC 706 manages radio resources, including the BTS. The BSC can be connected to several BTSs. The BSC and BTS components, in combination, are generally referred to as a base station (BSS) or radio access network (RAN) 703.

The GSM core network 701 also includes a Mobile Switching Center (MSC) 708, a Gateway Mobile Switching Center (GMSC) 710, a Home Location Register (HLR) 712, Visitor Location Register (VLR) 714, an Authentication Center (AuC) 718, and an Equipment Identity Register (EIR) 716. The MSC 708 performs a switching function for the network. The MSC also performs other functions, such as registration, authentication, location updating, handovers, and call routing. The GMSC 710 provides a gateway between the GSM network and other networks, such as an Integrated Services Digital Network (ISDN) or Public Switched Telephone Networks (PSTNs) 720. Thus, the GMSC 710 provides interworking functionality with external networks.

The HLR 712 is a database 135 that contains administrative information regarding each subscriber registered in a corresponding GSM network. The HLR 712 also contains the current location of each MS. The VLR 714 is a database 135 that contains selected administrative information from the HLR 712. The VLR contains information necessary for call control and provision of subscribed services for each MS currently located in a geographical area controlled by the VLR. The HLR 712 and the VLR 714, together with the MSC 708, provide the call routing and roaming capabilities of GSM. The AUC 716 provides the parameters needed for authentication and encryption functions. Such parameters allow verification of a subscriber's identity. The EIR 718 stores security-sensitive information about the mobile equipment.

A Short Message Service Center (SMSC) 709 allows one-to-one Short Message Service (SMS) messages to be sent to/from the MS 702. A Push Proxy Gateway (PPG) 711 is used to "push" (i.e., send without a synchronous request) content to the MS 702. The PPG 711 acts as a proxy between wired and wireless networks to facilitate pushing of data to the MS 702. A Short Message Peer to Peer (SMPP) protocol router 713 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, and short message service (SMS), the MS first registers with the network to indicate its current location by performing a location update and IMSI attach procedure. The MS 702 sends a location update including its current location information to the MSC/VLR, via the BTS 704 and the BSC 706. The location information is then sent to the MS's HLR. The HLR is updated with the location information received from the MSC/VLR. The location update also is performed when the MS moves to a new location area. Typically, the location update is periodically performed to update the database 135 as location updating events occur.

The GPRS network 730 is logically implemented on the GSM core network architecture by introducing two packet-switching network nodes, a serving GPRS support node (SGSN) 732, a cell broadcast and a Gateway GPRS support node (GGSN) 734. The SGSN 732 is at the same hierarchical level as the MSC 708 in the GSM network. The SGSN controls the connection between the GPRS network and the MS 702. The SGSN also keeps track of individual MS's locations and security functions and access controls.

A Cell Broadcast Center (CBC) 733 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 734 provides a gateway between the GPRS network and a public packet network (PDN) or other IP networks 736. That is, the GGSN provides interworking functionality with external networks, and sets up a logical link to the MS through the SGSN. When packet-switched data leaves the GPRS network, it is transferred to an external TCP-IP network 736, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 730 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS can not received pages from a circuit switched domain when engaged in a data call, since the MS is receiving data and is not listening to a paging channel. In a NOM3 network, a MS can monitor pages for a circuit switched network while received data and vise versa.

The IP multimedia network 738 was introduced with 3GPP Release 5, and includes an IP multimedia subsystem (IMS) 740 to provide rich multimedia services to end users. A representative set of the network entities within the IMS 740 are a call/session control function (CSCF), a media gateway control function (MGCF) 746, a media gateway (MGW) 748, and a master subscriber database, called a home subscriber server (HSS) 750. The HSS 750 can be common to the GSM network 701, the GPRS network 730 as well as the IP multimedia network 738.

The IP multimedia system 740 is built around the call/session control function, of which there are three types: an interrogating CSCF (I-CSCF) 743, a proxy CSCF (P-CSCF) 742, and a serving CSCF (S-CSCF) 744. The P-CSCF 742 is the MS's first point of contact with the IMS 740. The P-CSCF 742 forwards session initiation protocol (SIP) messages received from the MS to an SIP server in a home network (and vice versa) of the MS. The P-CSCF 742 can also modify an outgoing request according to a set of rules defined by the network operator (for example, address analysis and potential modification.)

The I-CSCF 743, forms an entrance to a home network and hides the inner topology of the home network from other networks and provides flexibility for selecting an S-CSCF. The I-CSCF 743 can contact a subscriber location function (SLF) 745 to determine which HSS 750 to use for the particular subscriber if multiple HSS's 750 are present. The S-CSCF 744 performs the session control services for the MS 702. This includes routing originating sessions to external networks and routing terminating sessions to visited networks. The S-CSCF 744 also decides whether an application server (AS) 752 is required to receive information on an incoming SIP session request to ensure appropriate service handling. This decision is based on information received from the HSS 750 (or other sources, such as an application server 752). The AS 752 also communicates to a location server 756 (e.g., a Gateway Mobile Location Center (GMLC)) that provides a position (e.g., latitude/longitude coordinates) of the MS 702.

The HSS 750 contains a subscriber profile and keeps track of which core network node is currently handling the subscriber. It also supports subscriber authentication and authorization functions (AAA). In networks with more than one HSS 750, a subscriber location function provides information on the HSS 750 that contains the profile of a given subscriber.

The MGCF 746 provides interworking functionality between SIP session control signaling from the IMS 740 and ISUP/BICC call control signaling from the external GSTN networks (not shown.) It also controls the media gateway (MGW) 748 that provides user 110-plane interworking functionality (e.g., converting between AMR- and PCM-coded voice.) The MGW 748 also communicates with other IP multimedia networks 754.

Push to Talk over Cellular (PoC) capable mobile phones register with the wireless network when the phones are in a predefined area (e.g., job site, etc.) When the mobile phones leave the area, they register with the network in their new location as being outside the predefined area. This registration, however, does not indicate the actual physical location of the mobile phones outside the pre-defined area.

While example embodiments of the present subject matter have been described in connection with various computing devices, the underlying concepts can be applied to any computing device or system capable of implementing the present subject matter. The various techniques described herein can be implemented in connection with hardware or software or, where appropriate, with a combination of both. Thus, the methods and apparatus for providing information pertaining to a motor vehicle, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing the present subject matter. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for providing information pertaining to a motor vehicle also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing information pertaining to a motor vehicle. When implemented on a general-purpose processor, the program code combines with the processor to provide a unique apparatus that operates to invoke the functionality of the present subject matter. Additionally, any storage techniques used in connection with the present subject matter can invariably be a combination of hardware and software.

While the present subject matter has been described in connection with the various embodiments of the various figures, it is to be understood that other similar embodiments can be used or modifications and additions can be made to the described embodiment for performing the same function of providing information pertaining to a motor vehicle without deviating therefrom. For example, one skilled in the art will recognize that a system for providing information pertaining to a motor vehicle as described can apply to any environment, whether wired or wireless, and can be applied to any number of devices connected via a communications network and interacting across the network. Therefore, providing information pertaining to a motor vehicle should not be limited to any single embodiment, but rather should be construed in breadth and scope in accordance with the appended claims.

What is claimed:

1. A device comprising:
a receiver configured to:
receive a signal indicative of a location of a mobile property, the signal being indicative of being provided by equipment of the mobile property; and
receive surveillance information from at least one selected monitoring device;
a processor configured to perform operations comprising:
comparing the location of the mobile property to a plurality of surveillance regions to determine if the location of the mobile property correlates with at least one of the plurality of surveillance regions, wherein:
the plurality of surveillance regions comprises a triggering location region;
each surveillance region of the plurality of surveillance regions is associated with a respective monitoring device; and
the comparing is performed independent of the mobile property being detected by a monitoring device;
for each surveillance region of the plurality of surveillance regions that correlates with the location of the mobile property, selecting each respective monitoring device for transmitting surveillance information associated with each respective surveillance region; and
a transmitter that transmits surveillance information received from each selected monitoring device.

2. The device in accordance with claim 1, the operations further comprising storing, in a database, positional data for the plurality of surveillance regions, wherein the comparing comprises comparing the location of the mobile property to the stored positional data.

3. The device in accordance with claim 1, wherein a surveillance region that correlates to the location of the mobile property comprises at least one of:
a surveillance region that includes the location of the mobile property,
a surveillance region that is proximate to the location of the mobile property, or
a surveillance region that includes a region comprising a variable range from the location of the mobile property.

4. The device in accordance with claim 1, wherein surveillance information is transmitted at the time it is received.

5. The device in accordance with claim 1, wherein the surveillance information is transmitted as at least one of an audio feed, a video feed, a broadcast, an email, an image, a picture, or a Short Message Service (SMS) message.

6. The device in accordance with claim 1, wherein the selected monitoring device comprises at least one of a video recorder or an audio recorder.

7. The device in accordance with claim 1, further comprising a network component configured to communicate with a plurality of monitoring devices via a network.

8. An apparatus comprising:
a processor; and
memory coupled to the processor, the memory comprising executable instructions that when executed by the processor cause the processor to effectuate operations comprising:
receiving a signal indicative of a location of a mobile property, the signal being indicative of being provided by equipment of the mobile property;
receiving surveillance information from at least one selected monitoring device;
comparing the location of the mobile property to a plurality of surveillance regions to determine if the location of the mobile property correlates with at least one of the plurality of surveillance regions, wherein:
the plurality of surveillance regions comprises a triggering location region;
each surveillance region of the plurality of surveillance regions is associated with a respective monitoring device; and
the comparing is performed independent of the mobile property being detected by a monitoring device;
for each surveillance region of the plurality of surveillance regions that correlates with the location of the mobile property, selecting each respective monitoring device for transmitting surveillance information associated with each respective surveillance region; and
transmitting surveillance information received from each selected monitoring device.

9. The apparatus in accordance with claim 8, the operations further comprising communicating with a plurality of monitoring devices via a network, wherein the monitoring device is at least one of the plurality of monitoring devices.

10. The apparatus in accordance with claim 9, wherein the network comprises at least one of a wireless communications network, a local area network, a metropolitan area network, a storage area network, or a system area network.

11. The apparatus in accordance with claim 9, wherein the network comprises a subscription-based network and the mobile property is a subscriber device of the subscription-based network.

12. The apparatus in accordance with claim 8, wherein the monitoring device is linked to at least one of a metropolitan area surveillance system, a private surveillance system, or a public surveillance system.

13. A method comprising:
receiving, by a processor, a signal indicative of a location of a mobile property as transmitted by equipment of the mobile property;
comparing, via the processor, the location of the mobile property to a plurality of camera surveillance regions to determine if the location of the mobile property correlates with at least one of the plurality of camera surveillance regions, wherein:
the plurality of camera surveillance regions comprises a triggering location region;
each camera surveillance region of the plurality of camera surveillance regions is associated with a respective monitoring device; and
the comparison is performed independent of the mobile property being detected in a camera surveillance region; and
when at least one of the plurality of camera surveillance regions correlates to the location of the mobile property, transmitting a feed from a camera covering the correlating camera surveillance region.

14. The method in accordance with claim 13, further comprising storing positional data for the plurality of camera surveillance regions.

15. The method in accordance with claim 13, wherein transmitting the feed from the camera comprises transmitting the feed from the camera to at least one of a central server or a mobile device.

16. The method in accordance with claim 15, wherein the camera and the at least one of the central server or the mobile device communicate via a network.

17. The method in accordance with claim 16, wherein the network comprises a subscription-based network, the method further comprising verifying that the mobile property is associated with a subscription for accessing services of the subscription-based network.

18. The method in accordance with claim 13, wherein the at least one of the plurality of camera surveillance regions correlates to the location of the mobile property when the at least one of the plurality of camera surveillance regions:
   includes the location of the mobile property,
   is proximate to the location of the mobile property, or
   includes a region comprising a variable range from the location of the mobile property.

19. The method in accordance with claim 13, wherein when more than one of the plurality of camera surveillance regions correlates to the location of the mobile property, the method further comprises selecting the camera for transmission that best correlates to the location of the mobile property.

20. The method in accordance with claim 13, the method further comprising transmitting the feed from a plurality of cameras, each camera having a camera surveillance region that correlates to the location of the mobile property.

21. The method in accordance with claim 13, wherein the camera is a first camera with a first camera surveillance region, the method further comprising:
   receiving an updated location of the mobile property;
   comparing the updated location of the mobile property to the plurality of camera surveillance regions; and
   selecting a second camera for transmission, wherein the second camera has a camera surveillance region that correlates to the location of the mobile property.

22. A computer-readable storage medium that is not a signal per se, the computer-readable storage medium having stored thereon executable instructions that when executed by a processor cause the processor to effectuate operations comprising:
   receiving an indication of a location of a mobile property as transmitted by equipment of the mobile property;
   receiving surveillance information from at least one selected monitoring device;
   comparing the location of the mobile property to a plurality of surveillance regions to determine if the location of the mobile property correlates with at least one of the plurality of surveillance regions, wherein:
      each surveillance region of the plurality of surveillance regions is associated with a respective monitoring device;
      the plurality of surveillance regions comprises a triggering location region; and
      the comparing is performed independent of the mobile property being detected by a monitoring device;
   for each surveillance region of the plurality of surveillance regions that correlates with the location of the mobile property, selecting each respective monitoring device for transmitting information associated with each respective surveillance region; and
   transmitting the information received from the selected monitoring device.

23. An apparatus comprising:
a processor; and
memory coupled to the processor, the memory comprising executable instructions that when executed by the processor cause the process to effectuate operations comprising:
   receiving, by a processor, a signal indicative of a location of a mobile property as transmitted by equipment of the mobile property;
   comparing, via the processor, the location of the mobile property to a plurality of camera surveillance regions to determine if the location of the mobile property correlates with at least one of the plurality of camera surveillance regions, wherein:
      each camera surveillance region of the plurality of camera surveillance regions is associated with a respective monitoring device;
      the plurality of camera surveillance regions comprises a triggering location region; and
      the comparison is performed independent of the mobile property being detected in a camera surveillance region; and
   when at least one of the plurality of camera surveillance regions correlates to the location of the mobile property, transmitting a feed from a camera covering the correlating camera surveillance region.

\* \* \* \* \*